(12) United States Patent
Zwijze et al.

(10) Patent No.: US 9,239,248 B2
(45) Date of Patent: Jan. 19, 2016

(54) MAGNETIC PROXIMITY SENSOR HAVING IMPROVED CAPABILITIES AND EFFICIENCY

(75) Inventors: Albert Ferdinand Zwijze, Vriezenveen (NL); Dale Reed Sogge, Wrentham, MA (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 150 days.

(21) Appl. No.: 13/472,272

(22) Filed: May 15, 2012

(65) Prior Publication Data

US 2012/0293165 A1 Nov. 22, 2012

(30) Foreign Application Priority Data

May 17, 2011 (EP) ..................................... 11166388

(51) Int. Cl.
*G01B 7/30* (2006.01)
*G01D 5/14* (2006.01)

(52) U.S. Cl.
CPC ....................... *G01D 5/145* (2013.01)

(58) Field of Classification Search
CPC ....................................................... G01D 5/145
USPC .................. 324/207.2–207.26, 117 H, 117 R, 324/173–174
See application file for complete search history.

(56) References Cited

U.S. PATENT DOCUMENTS

| | | | | |
|---|---|---|---|---|
| 3,531,671 A * | 9/1970 | Hohne | ....................... | F02P 7/07 310/168 |
| 4,229,696 A * | 10/1980 | Gustafson | ................ | 324/207.26 |
| 4,821,560 A * | 4/1989 | Kohlbauer | ................. | 73/114.26 |
| 4,853,629 A * | 8/1989 | Rops | ........................... | 324/207.2 |
| 4,905,507 A * | 3/1990 | Klein et al. | ................ | 73/115.08 |
| 5,045,920 A * | 9/1991 | Vig et al. | ....................... | 257/414 |
| 5,115,194 A * | 5/1992 | Luetzow et al. | ........... | 324/207.2 |
| 5,321,355 A * | 6/1994 | Luetzow | .................... | 324/207.2 |
| 5,781,005 A * | 7/1998 | Vig et al. | .................... | 324/207.2 |
| 6,483,293 B1 * | 11/2002 | Chen | ....................... | G01D 3/036 324/207.12 |
| 6,882,143 B2 * | 4/2005 | Clymer | ................ | G01D 5/2013 324/174 |
| 7,141,966 B2 * | 11/2006 | Sumiya et al. | ........... | 324/207.25 |
| 7,400,139 B2 * | 7/2008 | Spellman et al. | ........ | 324/207.25 |
| 7,990,136 B2 * | 8/2011 | Frachon et al. | .......... | 324/207.24 |
| 2003/0155909 A1 * | 8/2003 | Steinruecken et al. | .... | 324/207.2 |
| 2004/0130314 A1 * | 7/2004 | Bossoli et al. | ................ | 324/174 |
| 2004/0160220 A1 * | 8/2004 | Wendt | ...................... | 324/207.21 |
| 2006/0261801 A1 * | 11/2006 | Busch | ....................... | 324/207.21 |
| 2008/0048654 A1 * | 2/2008 | Takahashi et al. | ........ | 324/207.25 |
| 2009/0091315 A1 * | 4/2009 | Aoki | ........................ | 324/207.25 |
| 2010/0085040 A1 * | 4/2010 | Bussan | .................... | 324/207.21 |
| 2010/0090688 A1 * | 4/2010 | Mednikov | ................ | 324/207.15 |
| 2011/0080162 A1 * | 4/2011 | Steinich et al. | ........... | 324/207.25 |
| 2011/0267040 A1 * | 11/2011 | Frachon | ..................... | 324/207.2 |

FOREIGN PATENT DOCUMENTS

EP 2525193 A1 * 11/2012
FR 2936307 A1 * 3/2010 ............... G01D 5/14

* cited by examiner

*Primary Examiner* — Jay Patidar
(74) *Attorney, Agent, or Firm* — Tucker Ellis LLP

(57) ABSTRACT

Magnetic proximity sensor, comprising a magnetic sensor element, and a magnet assembly having a first pole surface and a second pole surface, wherein the first pole surface of the magnet assembly is positioned adjacent to a sensor target surface of the magnetic proximity sensor, and the sensor element is positioned at a first distance from the second pole surface of the magnet assembly remote from the sensor target surface.

12 Claims, 3 Drawing Sheets

MAGNETIC PROXIMITY SENSOR HAVING IMPROVED CAPABILITIES AND EFFICIENCY

PRIORITY CLAIM

This application claims priority to the following foreign patent application: European Patent Application No.: 11166388.6, filed May 17, 2011, by Albert Ferdinand Zwijze and Dale Reed Sogge, entitled "MAGNETIC PROXIMITY SENSOR" which is incorporated herein by reference.

FIELD OF THE INVENTION

The present invention relates to a magnetic proximity sensor, e.g. usable for detecting the presence or absence of a ferromagnetic article near the sensor. More in particular, the present invention relates to a magnetic proximity sensor, comprising a magnetic sensor element, and a magnet assembly having a first pole surface and a second pole surface.

PRIOR ART

U.S. Pat. No. 5,781,005 discloses a Hall effect ferromagnetic article proximity sensor, which is adapted to sense a ferromagnetic object in proximity of the sensor, such as (steel) teeth on a gear. The sensor comprises an assembly of a magnetic field sensor such as a Hall sensor element, and a magnet structure. The magnet structure is positioned behind the planar Hall sensor element viewed from a sensor target plane. When a ferromagnetic object passes near the sensor plane (i.e. near the Hall sensor element) a varying magnetic field is sensed. Because of the magnetic field orientation and distribution of the magnet structure in combination with the positioning of the Hall sensor element, an efficient signal processing can be implemented. The magnet structure is chosen such that at least both a North pole and a South pole are in a plane just behind the sensor element, resulting in a specific magnetic field orientation and distribution.

This sensor is a specific embodiment of the more generally known back biased Hall sensor, where a magnetic field is allowed to go through a magnetic field sensor towards a sensing surface of the sensor. A target at the sensing surface side of the sensor influences the magnetic field lines passing through the magnetic field sensor. These deviations can be sensed and the associated signals processed.

SUMMARY OF THE INVENTION

The present invention seeks to provide a magnetic proximity sensor having improved capabilities and efficiency.

According to the present invention, a magnetic proximity sensor according to the preamble defined above is provided, wherein the first pole surface of the magnet assembly is positioned adjacent to a sensor target surface of the magnetic proximity sensor, and the sensor element is positioned at a first distance from the second pole surface of the magnet assembly remote from the sensor target surface. This configuration allows to build and assemble a proximity sensor in a very efficient manner, with high sensitivity and reliability.

BRIEF DESCRIPTION OF DRAWINGS

The present invention will be discussed in more detail below, using a number of exemplary embodiments.

DETAILED DESCRIPTION

Prior art sensor designs have a sensing Hall chip that is located in between the magnet of the sensor and the target of the system. Although, in theory, this design could function as a sensor for ferromagnetic objects (objects with high magnetic permeability such as objects made of iron or iron alloy), the design does not work well in all applications. One reason for this deficiency is the very high baseline or no-object-present magnetic flux and signal. The object-present signal in many application situations is not so much greater than the baseline signal and the presence of electronic noise can cause the prior art design to be unreliable.

Figure 1A:
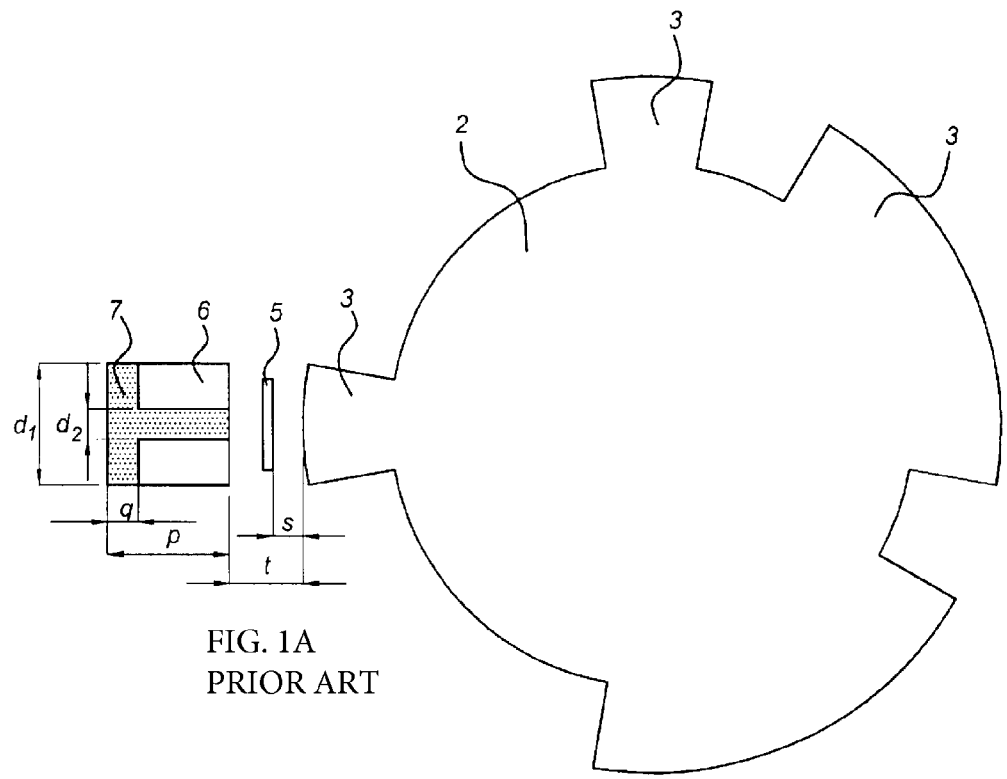
FIG. 1A shows a schematic diagram showing a prior art magnetic proximity sensor with a Hall chip.

Prior art work shown in U.S. Pat. No 5,781,005 gives a solution to overcome this high bias problem (see the prior art embodiment shown in FIG. 1A). FIG. 1A shows a simplified diagram of a magnetic proximity sensor implemented for detecting extending teeth 3 on a rotating disc 2 (e.g. for rpm measurement).

Here a pole piece 7 is placed in a hole or bore of a (permanent) magnet 6 to have opposing poles at the magnet face located at the chip side. The magnet 6 is a cylinder shaped magnet with a height p and an outer diameter $d_1$, and has a central bore with diameter $d_2$. The pole piece 7 is of the T-shape variant, having a thickness q, and a stem with diameter $d_2$, thus providing a cylinder shaped magnet assembly with outer diameter $d_1$ and height p. A first pole of the magnet assembly 6, 7 is facing the target (teeth 3), and is positioned at a distance t. A Hall sensor 5 is positioned at a distances from the target (teeth 3), between the target and the first face of the magnet assembly 6, 7. In this way zero flux can be generated when a slot is present. Sensitivity versus bias is defined in the following way:

Sens=(B_tooth−B_slot)/(max(|B_tooth|,|B_slot|))
*100%,_where B_tooth is the magnetic flux density when a tooth 3 is present in the vicinity of the sensor surface (first pole) and B_slot is the magnetic flux density when a slot (space of disc 2 between two neighboring teeth 3) is present in the vicinity of the sensor surface.

Figure 1B:
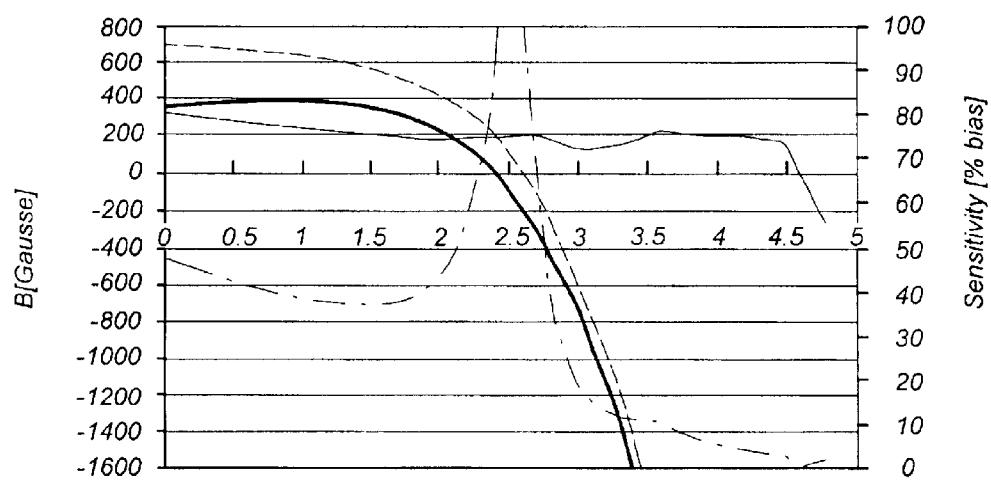
FIG. 1B shows a graph of characteristics of the magnetic proximity sensor of FIG. 1.

The graphs in FIG. 1B show that when placing the Hall sensor 5 between t=2.4 and 2.6 mm in this prior art set-up the sensitivity can be made >100% of the bias. This is a dramatic improvement with respect to previous work (other back biased magnetic sensor element embodiments) where sensitivity is <20%. However, drawback of this principle is that the chip leads of the Hall sensor 5 need to be folded around the magnet 6 as the Hall sensor element needs to be positioned between the magnet 6 and the sensor front surface where the target (metal tooth 3) is present (or absent). This reduces the magnet area and hence the strength as well as increasing the overall dimensions to allow room for the lead bend. Additionally the magnet 6 is restricted from being close to the target 3 because of the need to leave space for the Hall sensor 5, this leads to lower signal or the need for a stronger and/or larger magnet 6. Especially when small sensors are needed this might be a problem. In addition remnant magnetization of the target 3 can have significant influence on the sensor signal since the hall sensor 5 is located close to the target 3.

For these measurement, the following design parameters were used:

$d_1$=8 mm; $d_2$=2 mm; p=6 mm; q=2 mm; s=4.775 mm.

Figure 2A:
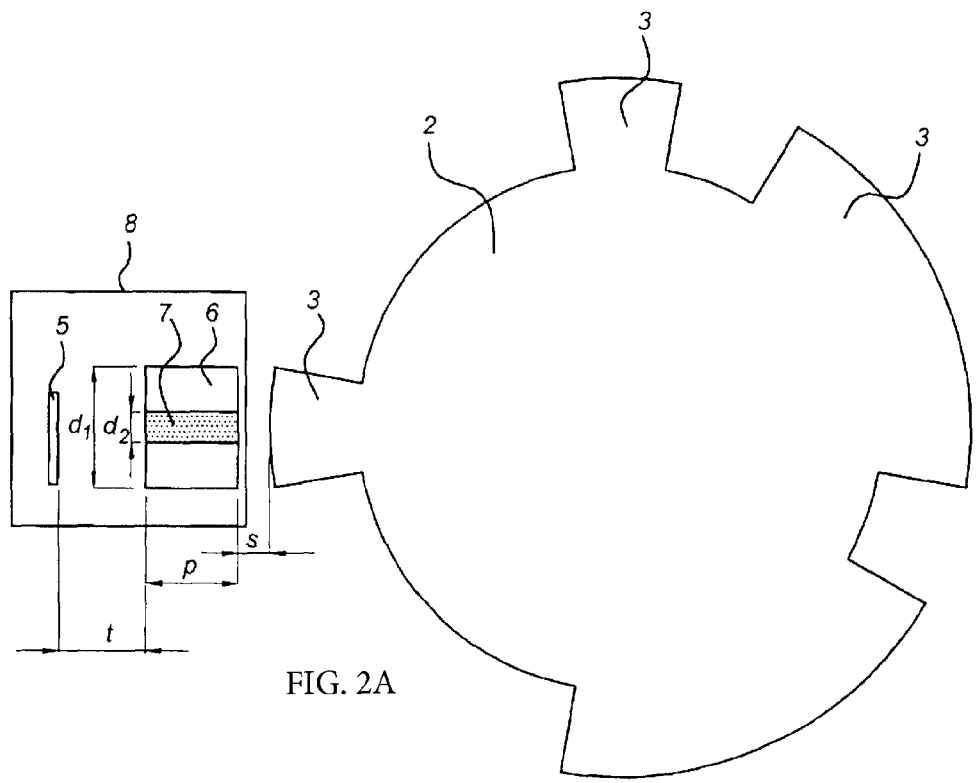
FIG. 2A shows a schematic diagram of an embodiment of the present invention magnetic proximity sensor.

The present invention embodiments have an improved functioning. FIG. 2A shows a simplified diagram of an embodiment of the magnetic proximity sensor according to the present invention. Again a target is illustrated comprising a disc 2 with extending teeth 3. In this case, a magnet 6 is provided of a cylindrical type and a central bore (outer diameter $d_1$, bore diameter $d_2$ and height (or length) p), as well as an axial pole piece 7 with an outer diameter $d_2$ and length p. The magnet assembly thus comprises an axial pole piece 7 with a coaxially positioned magnet body or magnet 6. The magnetic field sensor 5 (e.g. a Hall sensor) is positioned at the side of the magnet assembly facing away from the target 3, at a distance t from a second pole face of the magnet assembly 6, 7. A first pole face of the magnet assembly 6, 7 faces the target (disc 2 and teeth 3), and is positioned at a distance s from the teeth 3. The magnetic proximity sensor elements 5, 6, 7, may be provided in a sensor housing 8, e.g. using plastic molding techniques. The sensor housing 8 may also cover the sensor surface of the first pole of the magnet assembly 6, 7, as shown, or it may leave the sensor surface free.

The back biased configuration of the prior art embodiment described above is altered, but an efficient magnetic field distribution (as close to target 3 as possible) is maintained and a measurement using a magnetic field sensor 5 at the back face of a magnet assembly 6, 7 is used.

Figure 2B:
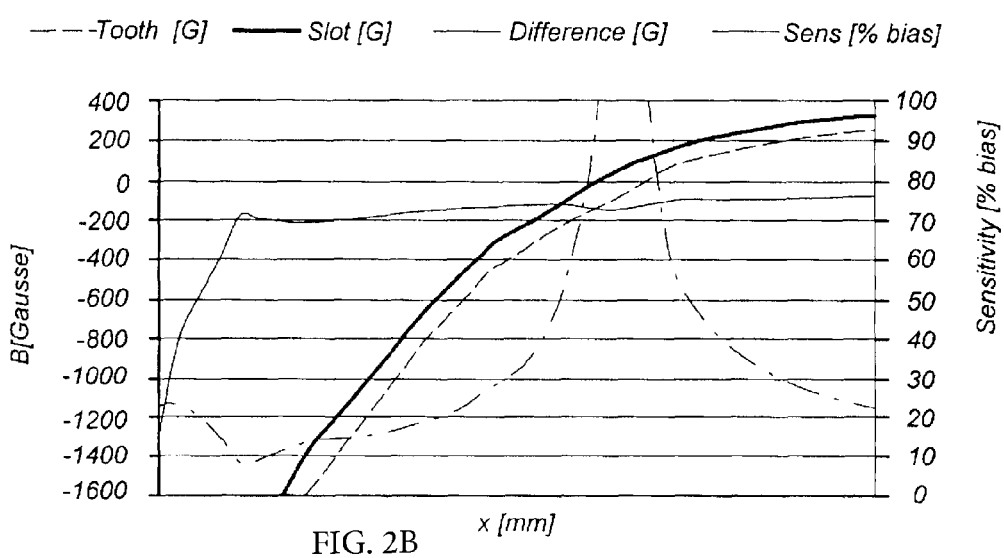
FIG. 2B shows a graph of characteristics of the magnetic proximity sensor of FIG. 2.
Figure 3:
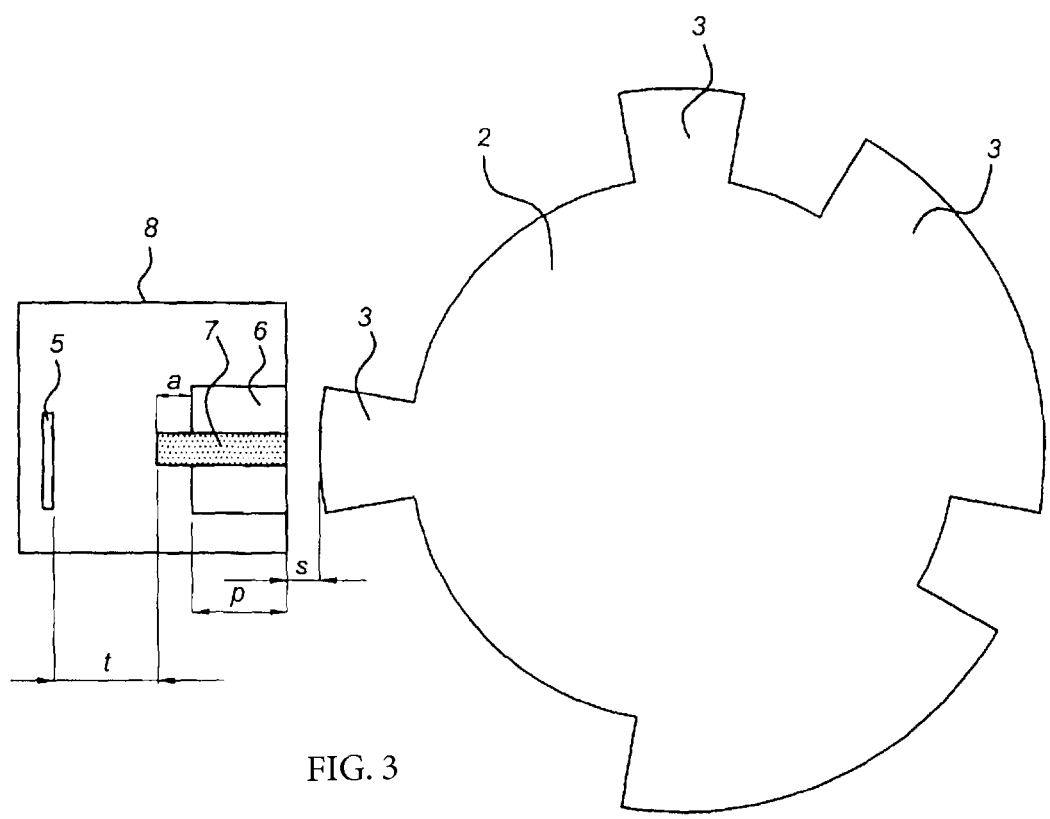
FIG. 3 shows a schematic diagram of a further embodiment of the present invention magnetic proximity sensor.

The present invention shows a design where the Hall sensor 5 is located on the other side of the magnet 6: magnet 6 in between Hall sensor 5 and target 3 while a sensitivity >100% is still guaranteed (see the embodiments shown in FIGS. 2a and 3). The presence of a tooth 3 or a slot (space of disc 2 between two neighboring teeth 3) takes care that the amount of flux conveyed through the pole piece (magnet assembly 6, 7) is changing. Left of the magnet 6 at position t this change is sensed by the Hall sensor 5. The graph in FIG. 2B shows that when placing the Hall sensor 5 between t=2.15 and 2.4 mm the sensitivity can be made >100% of the bias. Advantage of this principle is that the Hall sensor 5 leads do not need to be folded around the magnet 6. In addition, any remnant magnetization of the target 2, 3 will have less influence on the sensor signal since the hall sensor 5 is moved further away from the target 2, 3.

In the FIG. 2A embodiment, the following applies:

A magnet assembly 6, 7 is used with the characteristics that the coercive force (Hc) is about 900 kA/m and magnetic field strength (Br) is about 1.14 T by choosing the right materials. The pole piece 7 is a soft magnetic material with a relative permeability (Ur) of 1000.

"t" is the position of the Hall sensor 5 behind the (second pole) of the magnet assembly 6, 7.

In a further embodiment, a gap with the sensor front surface (first pole) is taken to be 1 mm by including the 0.5 mm thickness of a plastic housing 8 covering and protecting the first pole of the magnet assembly 6, 7: thus the distance s=1.5 mm (distance from magnet assembly front surface to target 3).

Sensitivity as a percentage of bias is defined as:

Sens=(B_tooth−B_slot)/(max(|B_tooth|,|B_slot|))
*100%.

In a range of 2.2 to 2.7 mm behind the Hall sensor 5 the sensitivity as a percentage of bias can be made. When placing the Hall sensor 5 between t=2.15 and 2.4 mm behind the magnet 6 the sensitivity as a percentage of bias can be made >100%.

These results (see FIG. 2B) are comparable to the results presented in FIG. 1B, i.e. a range of distances behind the magnet can be defined where the sensitivity is very high.

For these measurement, the following design parameters were used:

$d_1$=8 mm; $d_2$=3 mm; p=6 mm; s=1.5 mm.

In alternative embodiments, the following parameters can be selected:

$d_1$=6 mm . . . 12 mm
$d_2$=2 mm . . . 5 mm
s=0.7 mm . . . 2.5 mm
p=4 mm . . . 12 mm

Depending on the chosen values of the parameters, a point t can be calculated where the sensitivity of the magnetic proximity sensor is highest, as well as a range around that point where a high sensitivity can be realized.

In more general wording, the present invention relates to a magnetic proximity sensor, comprising a magnetic sensor element 5 (such as a Hall sensor element), and a magnet assembly 6, 7 having a first pole surface and a second pole surface, wherein the first pole surface of the magnet assembly is positioned adjacent to a sensor target surface of the magnetic proximity sensor, and the sensor element 5 is positioned at a first distance t from the second pole surface of the magnet assembly 6, 7 remote from the sensor target surface.

The magnet assembly may comprise an axial pole piece 7 (a flux concentrator, e.g. cylindrical, soft magnetic material) with a coaxially positioned magnet body 6. A T-shaped pole piece as in prior art sensors is not needed.

In an embodiment the magnetic proximity sensor further comprises a sensor housing 8 (see FIG. 2A and 3), defining the sensor target surface, wherein the sensor element 5 and magnet assembly 6, 7 are embedded in the sensor housing 8. Also sensor element circuitry, e.g. for processing measurement signals in the sensor itself may be provided in the sensor housing 8, e.g. on a sensor substrate or printed circuit board.

The sensor housing 8 covers the first pole surface of the magnet assembly 6, 7 with a thickness of at least 0.1 mm, e.g. at least 0.5 mm, in a further embodiment (see FIG. 2A). This allows to have a well defined sensor target surface, and also a close vicinity of the target 2, 3 to be sensed to the magnetic field generated by the magnet assembly 6, 7. In an alternative embodiment, the housing 8 is flush with the first pole surface of the magnet assembly 6, 7, as shown in the embodiment of FIG. 3.

In an embodiment, the first distance t is between 2.2 and 2.7mm. This is in combination with a pole piece diameter $d_2$ of 3 mm, magnet body diameter $d_1$ of 8 mm, length p 6 mm, and target distance of 1mm (1.5mm), as described in the embodiment shown in FIG. 2A, which results in a maximum sensitivity at t=2.34mm.

FIG. 3 shows an alternative embodiment, with a differently shaped second pole surface, wherein the axial pole piece 7 extends beyond the coaxially positioned magnet body 6. The length of the magnet 6 is indicated by p, and the axial pole piece extends a distance a beyond the length of the magnet 6. The first pole of the magnet assembly 6, 7 is similar to the FIG. 2A embodiment, and provides a flat magnet assembly surface forming the first pole.

This embodiment has the effect that a less steep gradient of absolute level of the flux density can be obtained in combination with a higher sensitivity. Comparative tests have been done for an embodiment where $d_1$=5.5mm, $d_2$=2mm, p=4.4mm, s=1.8mm, and where the parameter was varied (−0.5, −0.1, 0.1, 0.5 and 1mm) It was found that a longer pole piece 7 (positive value of l) gives less steep gradients causing positional tolerances of the Hall sensor 5 (value t) to be less critical. For a=0.5mm, t=0.6mm is recommended: or if a increases, t can decrease. Although a longer pole piece gives a little bit less sensitivity for the same value of t, the decrease of t for a higher value of 1 results in a larger sensitivity in the end.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. A magnetic proximity sensor, comprising,
a sensor housing having a sensor target surface;
a magnetic sensor element; and
a magnet assembly having a first pole surface and a second pole surface
wherein the magnetic sensor element and the magnet assembly are embedded in the sensor housing;
wherein the first pole surface of the magnet assembly is positioned adjacent to the sensor target surface of the sensor housing;
wherein the magnetic sensor element is positioned at a first distance from the second pole surface of the magnet assembly, remote from the sensor target surface;
wherein the magnet assembly is arranged between the magnetic sensor element and the sensor target surface;
wherein the magnet assembly comprises an axial pole piece coaxially positioned within a magnet body; and
wherein the axial pole piece extends beyond the magnet body toward the magnetic sensor element.

2. The magnetic proximity sensor of claim 1, wherein the sensor housing covers the first pole surface of the magnet assembly with a thickness of at least 0.1mm.

3. The magnetic proximity sensor of claim 1, wherein the first distance is between 2.2 and 2.7mm.

4. A magnetic proximity sensor, comprising:
a sensor housing arrangeable opposite a target;
a magnetic sensor element; and
a magnet assembly;
wherein the magnetic sensor element and the magnet assembly are embedded within the sensor housing;
wherein when the sensor housing is arranged opposite the target, the magnet assembly is positioned between the magnetic sensor element and the target;
wherein the magnet assembly comprises an axial pole piece coaxially positioned within a magnet body; and
wherein the axial pole piece extends beyond the magnet body toward the magnetic sensor element.

5. The magnetic proximity sensor of claim 4, wherein the magnetic sensor element is positioned at a distance of between 2.2 and 2.7 millimeters from the magnet assembly.

6. The magnetic proximity sensor of claim 4,
wherein the sensor housing has a surface;
wherein when the sensor housing is arranged opposite the target, the surface is positioned between the magnet assembly and the target; and
wherein the magnet assembly is embedded in the sensor housing such that a gap of at least 0.1 millimeters exists between the surface and the magnet assembly.

7. The magnetic proximity sensor of claim 4,
wherein when the sensor housing is arranged opposite the target, a first pole of the magnet assembly faces the target and a second pole of the magnet assembly faces the magnetic sensor element.

8. A magnetic proximity sensor, comprising:
a target;
a sensor housing arranged opposite the target;
a magnetic sensor element; and
a magnet assembly;
wherein the magnetic sensor element and the magnet assembly are embedded within the sensor housing such that the magnet assembly is positioned between the magnetic sensor element and the target;
wherein the magnet assembly comprises an axial pole piece coaxially positioned within a magnet body; and
wherein the axial pole piece extends beyond the magnet body toward the magnetic sensor element.

9. The magnetic proximity sensor of claim 8, wherein the target is a disc having one or more teeth.

10. The magnetic proximity sensor of claim 8, wherein the magnetic sensor element is positioned at a distance of between 2.2 and 2.7 millimeters from the magnet assembly.

11. The magnetic proximity sensor of claim 8,
wherein the sensor housing has a surface;
wherein the surface is positioned between the magnet assembly and the target; and
wherein the magnet assembly is embedded in the sensor housing such that a gap of at least 0.1 millimeters exists between the surface and the magnet assembly.

12. The magnetic proximity sensor of claim 8,
wherein a first pole of the magnet assembly faces the target and a second pole of the magnet assembly faces the magnetic sensor element.

* * * * *